United States Patent
Li et al.

(10) Patent No.: US 8,612,718 B2
(45) Date of Patent: Dec. 17, 2013

(54) MAPPING ALIGNMENT (75) Inventors: Jinglei Li, Eden Prairie, MN (US); Fumin Zhang, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 769 days.

(21) Appl. No.: 12/544,111

(22) Filed: Aug. 19, 2009

(65) Prior Publication Data

US 2011/0047347 A1 Feb. 24, 2011

(51) Int. Cl.
*G06F 3/06* (2006.01)

(52) U.S. Cl.
CPC .............. *G06F 3/0613* (2013.01); *G06F 3/064* (2013.01); *G06F 3/0673* (2013.01)
USPC ....................................................... 711/201

(58) Field of Classification Search
USPC ....................................................... 711/201
See application file for complete search history.

(56) References Cited

U.S. PATENT DOCUMENTS

| | | | |
|---|---|---|---|
| 5,404,485 A | 4/1995 | Ban | |
| 5,937,425 A | 8/1999 | Ban | |
| 6,125,435 A | 9/2000 | Estakhri et al. | |
| 6,591,330 B2 | 7/2003 | Lasser | |
| 7,089,394 B2 * | 8/2006 | Royer, Jr. ...................... | 711/201 |
| 7,673,115 B1 * | 3/2010 | Don et al. ...................... | 711/201 |
| 8,402,246 B1 * | 3/2013 | de la Iglesia .................. | 711/201 |
| 8,484,433 B2 * | 7/2013 | Faith et al. ..................... | 711/201 |
| 2004/0085849 A1 | 5/2004 | Myoung et al. | |
| 2006/0026341 A1 | 2/2006 | Lasser | |
| 2006/0136655 A1 * | 6/2006 | Gorobets et al. .............. | 711/103 |
| 2007/0005929 A1 | 1/2007 | Post et al. | |
| 2007/0043900 A1 | 2/2007 | Yun | |
| 2007/0079105 A1 * | 4/2007 | Thompson .................... | 711/201 |
| 2007/0258288 A1 | 11/2007 | Amidon et al. | |
| 2008/0028162 A1 * | 1/2008 | Thompson .................... | 711/154 |
| 2008/0183955 A1 | 7/2008 | Yang et al. | |
| 2008/0195801 A1 | 8/2008 | Cheon et al. | |
| 2008/0201518 A1 | 8/2008 | Kim et al. | |
| 2008/0307192 A1 | 12/2008 | Sinclair et al. | |
| 2008/0320214 A1 | 12/2008 | Ma et al. | |
| 2009/0037652 A1 | 2/2009 | Yu et al. | |
| 2009/0106486 A1 | 4/2009 | Kim et al. | |
| 2010/0185830 A1 * | 7/2010 | Asnaashari et al. .......... | 711/206 |

OTHER PUBLICATIONS

Jin Qian et al. "A Linux Implementation Validation of Track-Aligned Extents and Track-Aligned RAIDs." Jun. 2008. USENIX. 2008 USENIX Annual Technical Conference.*

Intel "Understanding the Flash Translation Layer (FTL) Specification", AP-684, Order No. 297816-002, Dec. 1998, 20 pgs.

* cited by examiner

*Primary Examiner* — Nathan Sadler (74) *Attorney, Agent, or Firm* — Hollingsworth Davis, LLC (57) ABSTRACT

In general, this disclosure is directed to techniques for adjusting a mapping between a logical block address (LBA) space and a physical block address (PBA) space based on offset data associated with a plurality of access requests. According to one aspect, a method includes defining a translation map between a plurality of LBAs and a plurality of PBAs for a data storage device. Each PBA is associated with a sequence of storage slots. The translation map maps each of the LBAs to a PBA and to an index of a storage slot associated with the PBA. The method further includes obtaining offset data for a plurality of access requests associated with the plurality of LBAs. The offset data includes information relating to the indices to which starting LBAs of the access requests are mapped. The method further includes adjusting the translation map based on the offset data.

15 Claims, 8 Drawing Sheets

| LOGICAL BLOCK ADDRESS | ERASURE BLOCK | PAGE OFFSET | SLOT INDEX |
|---|---|---|---|
| 996 | 3 | 63 | 0 |
| 997 | 3 | 63 | 1 |
| 998 | 3 | 63 | 2 |
| 999 | 3 | 63 | 3 |
| 1000 | 4 | 0 | 0 |
| 1001 | 4 | 0 | 1 |
| 1002 | 4 | 0 | 2 |
| 1003 | 4 | 0 | 3 |
| 1004 | 4 | 1 | 0 |
| 1005 | 4 | 1 | 1 |
| 1006 | 4 | 1 | 2 |
| 1007 | 4 | 1 | 3 |

FIG. 3

| LOGICAL BLOCK ADDRESS | ERASURE BLOCK | PAGE OFFSET | SLOT INDEX |
|---|---|---|---|
| 995 | 3 | 63 | 0 |
| 996 | 3 | 63 | 1 |
| 997 | 3 | 63 | 2 |
| 998 | 3 | 63 | 3 |
| 999 | 4 | 0 | 0 |
| 1000 | 4 | 0 | 1 |
| 1001 | 4 | 0 | 2 |
| 1002 | 4 | 0 | 3 |
| 1003 | 4 | 1 | 0 |
| 1004 | 4 | 1 | 1 |
| 1005 | 4 | 1 | 2 |
| 1006 | 4 | 1 | 3 |

MAPPING ALIGNMENT

BACKGROUND

Data storage devices may generally be divided into word-addressed storage devices and block-addressed storage devices. In a word-addressed storage device, the smallest addressable data unit is a single data word. In a block-addressed storage device, the smallest addressable data unit is a data block, which may include a sequence of multiple data words. In general, a data word may refer to a standard smallest unit of processed data in a data access system. In some examples, a data word may be a single bit, 8 bits (i.e., a byte), 16 bits, 32 bits, or 64 bits. In additional examples, the data word may correspond to the width of a data bus connected to or within the data access system.

One example of a block-addressed storage device is a hard disk drive. The data blocks in a hard drive are often referred to as sectors, which typically contain 512 bytes. In many hard drives today, the individual sectors within a hard drive are indexed according to a logical block addressing scheme. Under such a scheme, each sector within the hard drive is mapped to a unique logical block address (LBA). The entire collection of LBAs associated with a hard drive may be referred to as an LBA space. Typically, the LBA space starts with an LBA equal to zero and increments by one for each subsequent LBA.

Another example of a block-addressed storage device is a block-addressed solid-state storage device. The data blocks in such devices may be referred to as pages. Thus, the smallest addressable data unit from which data can be read and to which data can be written is usually a page. Example page sizes for block-addressed solid-state storage devices include page sizes of 2 kilobytes (KB), 4 KB and 8 KB.

Unlike hard drives, solid state storage devices typically do not require mechanically-moving parts in order to transfer data into and out of the storage device. For example, a solid-state storage device may store data by changing the state of electrical components within the device. Because of seek times and rotational latency associated with the moving parts within a hard drive, hard drives generally require a greater amount of time to perform access operations as compared to solid-state storage devices. Thus, there is increasing interest in using solid state storage devices to emulate the functionality of a hard drive.

SUMMARY

According to one aspect of the invention, a method includes defining a translation map between a plurality of logical block addresses (LBAs) and a plurality of physical block addresses (PBAs) for a data storage device. Each PBA is associated with a sequence of storage slots. The translation map maps each of the LBAs to a PBA and to an index of a storage slot associated with the PBA. The method further includes obtaining offset data for a plurality of access requests associated with the plurality of LBAs. The offset data includes information relating to the indices to which starting LBAs of the access requests are mapped. The method further includes adjusting the translation map based on the offset data.

According to another aspect of the invention, a device includes one or more programmable processors. The device further includes a mapping module executing on the one or more programmable processors. The mapping module is configured to define a translation map between a plurality of logical block addresses (LBAs) and a plurality of physical block addresses (PBAs) for a data storage device. Each PBA is associated with a sequence of storage slots. The translation map maps each of the LBAs to a PBA and to an index of a storage slot associated with the PBA. The device further includes a data gatherer module executing on the one or more programmable processors. The data gather module is configured to obtain offset data for a plurality of access requests associated with the plurality of LBAs. The offset data includes information relating to the indices to which starting LBAs of the access requests are mapped. The mapping module is further configured to adjusting the translation map based on the offset data.

According to another aspect of the invention, a computer-readable storage medium includes executable instructions that cause one or more processors to define a translation map between a plurality of logical block addresses (LBAs) and a plurality of physical block addresses (PBAs) for a data storage device. Each PBA is associated with a sequence of storage slots. The translation map maps each of the LBAs to a PBA and to an index of a storage slot associated with the PBA. The computer-readable storage medium further includes executable instructions that cause one or more processors to obtain offset data for a plurality of access requests associated with the plurality of LBAs. The offset data includes information relating to the indices to which starting LBAs of the access requests are mapped. The computer-readable storage medium further includes executable instructions that cause one or more processors to adjust the translation map based on the offset data.

According to another aspect of the invention, a method includes obtaining offset data for a plurality of access requests associated with a logical block address (LBA) space. The offset data includes information relating to a remainder operation applied to a dividend and divisor for each access request. The dividend for each access request is a starting LBA for the access request. The divisor for each access request is a number of LBA storage slots within each physical block associated with a physical block address (PBA) space. The method further includes determining an alignment offset of the LBA space based on the offset data. The alignment offset corresponds to the offset data for a subset of the plurality of access requests. The method further includes defining a translation map between the logical block address (LBA) space and the physical block address (PBA) space based on the alignment offset such that starting LBAs of the subset of access requests correspond to starting storage slots of physical blocks associated with the physical block address (PBA) space.

These and various other features and advantages will be apparent from a reading of the following detailed description.

DETAILED DESCRIPTION

In general, this disclosure is directed to techniques for adjusting a mapping between a logical block address (LBA) space and a physical block address (PBA) space based on offset data associated with a plurality of access requests. The mapping adjustment techniques described herein can provide better alignment between LBA ranges associated with specific data access requests and the corresponding physical blocks of data within a data storage device. In other words, when a mapping is defined and/or adjusted according to the techniques in this disclosure, the frequency at which the starting LBA of a data access request maps to the starting storage slot of a physical data block within the data storage device may be increased relative to other translation mapping techniques. As used herein, a physical block may refer to a data storage block within a block-addressed data storage device, and a PBA may refer to the address of a particular physical block. In some examples, physical blocks may refer to pages within a flash memory device, and a PBA may refer to a page address within the flash memory device.

Given a certain system configuration and software setup, workload data traces show that the LBA alignment with respect to physical blocks in a data storage device is generally fixed and not dependent upon specific read commands and write commands. Thus, the LBA alignment does not generally change unless some changes such as file system formatting is performed on an existing system. Such changes may occur infrequently. Therefore, by adjusting and/or defining translation maps based on offset data associated with data access requests issued from an actual system during operation, the translation map can be tailored "on-the-fly" for a specific system configuration and software setup.

As already described above, the mapping alignment techniques in this disclosure can achieve better alignment between starting LBAs of data access requests and starting storage slots of PBAs within a data storage device relative to conventional mapping techniques. Therefore, the number of physical blocks required to store or retrieve data blocks associated with a data access request may be reduced relative to conventional mapping techniques.

Consider an example where eight LBA storage slots are mapped to each physical block within a data storage device. Then, consider a data access request that requests access to a sequence of eight LBAs. Using conventional techniques, it is possible that the eight LBA data blocks associated with the data access request may overlap between two different physical blocks within the data storage device. However, the novel mapping alignment techniques described in this disclosure may, in some circumstances, adjust the mapping such that the eight LBA data blocks are stored within a single physical block. Thus, the number of physical data blocks accessed for a given data access request may be reduced, thereby reducing the number of physical data block read/write operation required to service a data access request. In this example, the number physical data block access operations is reduced by 50%, which can provide substantial improvement in data access latency.

Moreover, the amount of free storage space within the data storage device may be increased because each time the eight LBA blocks associated with the data access request need to be rewritten to the data storage device, only a single physical data block (rather than two data blocks) needs to be marked as invalid. In order to store new data in the invalid data blocks, in some examples, a garbage collection operation may need to be performed. Since the techniques in this disclosure may reduce the number of physical blocks that need to be marked as invalid, the techniques in this disclosure may also reduce garbage collection overhead within the data storage device.

Figure 1:
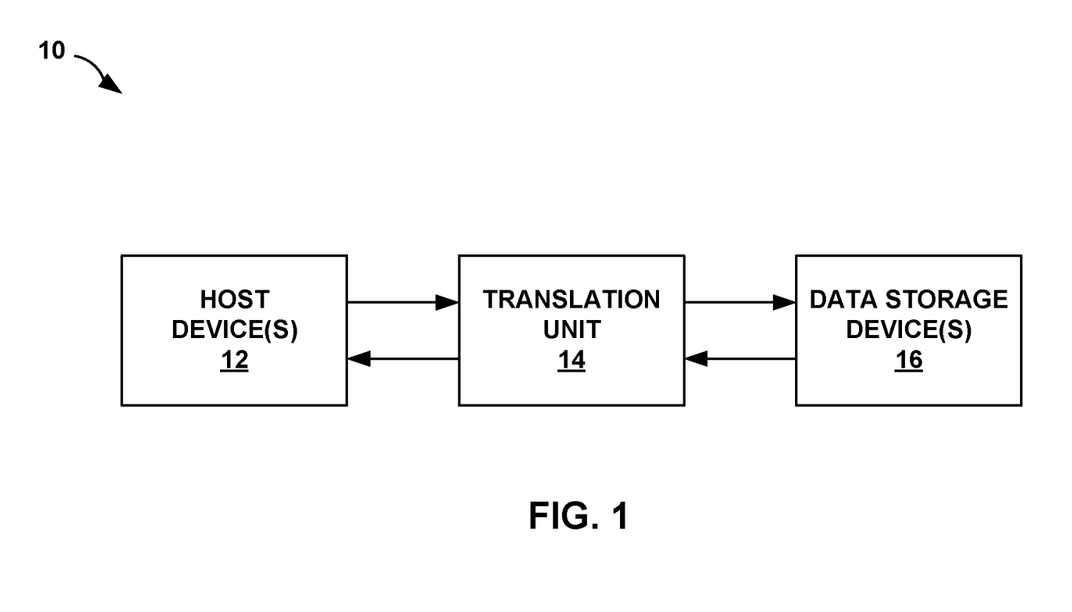
FIG. 1 is a block diagram illustrating a data access system according to one aspect of the present invention.

FIG. 1 is a block diagram illustrating a data access system 10 according to one aspect of the present invention. Data access system 10 allows host device 12 to access data stored within a data storage device 16. Data access system 10 includes host device 12, translation unit 14, and data storage device 16. Host device 12 may include one or more host devices. Similarly, data storage device 16 may include one or more data storage devices. Host device 12 is coupled to translation unit 14, and translation unit 14 is coupled to storage device 16. In some examples, host device 12 may also be coupled to data storage device 16 (not shown).

Host device 12 is configured to issue data access requests to data storage device 16 via translation unit 14. The data access requests may include read access requests and write access requests. A read access request may include information that identifies a portion of the data storage device 16 from which data should be read. A write access request may include information that identifies a portion of data storage device 16 to which data should be written. The write access request may also include the data to be written to the storage device. In any case, host device 12 transmits the access request to data storage device 16 via translation unit 14.

In some examples, the information that identifies the portion of data storage device 16 from which data should be read or to which data should be written may include a range of logical block addresses (LBAs). The range of LBAs may, in some examples, be identified with a starting LBA field and a transfer length field. The starting LBA field identifies the first LBA in the range of LBAs. The transfer length field identifies the length (i.e., number of LBAs) within the LBA range. Each LBA within the range of LBAs may, in some examples, correspond to a logical hard drive sector addressable by host device 12.

In some examples, host device 12 may be a computing device having one or more processors. The computing device may, in some examples, have a host software module executing on the one or more processors, which issues the data access requests to the translation unit 14. In some examples, the host software module may include operating system software, device driver software, and/or other software configured to control data storage device 16.

In further examples, host device 12 may be implemented as a device controller or host adaptor. For example, host device 12 may be implemented as Small Computer System Interface (SCSI) host bus adaptor. In such examples, host device 12 may be used as an interface between data storage device 16 and a computing device.

Translation unit 14 is configured to translate LBAs within data access requests into PBAs. Translation unit 14 may include one or more translation maps, which store translation information for mapping between an LBA space and a PBA space. The PBAs correspond to physical data blocks within data storage device 16 that contain data associated with the LBAs. In some examples, the physical blocks may refer to pages within a flash memory device, and the each PBA may refer to a page address within the flash memory device.

According to this disclosure, translation unit 14 may be configured to adjust and/or define the translation maps based on offset data associated with a plurality of data access requests. In some examples, translation unit 14 may be configured to define a translation map between a plurality of logical block addresses (LBAs) and a plurality of physical block addresses (PBAs) for a data storage device, obtain offset data for a plurality of access requests associated with the plurality of LBAs, and adjust the translation map based on the offset data.

In additional examples according to this disclosure, translation unit 14 may be configured to obtain offset data for a plurality of access requests associated with a logical block address (LBA) space, determine an alignment offset of the LBA space based on the offset data, define a translation map between the logical block address (LBA) space and the physical block address (PBA) space based on the alignment offset such that starting LBAs of the subset of data access requests correspond to starting storage slots of physical blocks associated with the physical block address (PBA) space.

The data request access pattern initiated from host device 12 to data storage device 16 may be referred to as a data workload. This pattern may be defined or configured by different characterization parameters. Such parameters may include, for example, a data request transfer length parameter, command queuing statistics parameters, an Input/Output per second (IOPS) parameter, a read-write ratio parameter, and a parameter indicating the starting LBA alignment distribution in access requests. Given a certain system configuration and software setup, data trace workloads may show that the LBA alignment with respect to physical blocks in a data storage device or a subset of the data storage device is generally fixed and not dependent upon specific read commands and write commands. Thus, the LBA alignment may not generally change unless changes are made to the system, such as reformatting the file system or repartitioning of the LBA space into multiple subsets. Such changes may occur infrequently. Therefore, by adjusting and/or defining translation maps based on offset data associated with data access requests issued from an actual system in operation, the translation map can be tailored "on-the-fly" for a specific system configuration and software setup.

As already described above, translation unit 14 can achieve better alignment between starting LBAs of data access requests and starting storage slots of PBAs within data storage device 16 relative to conventional mapping techniques. Therefore, the number of physical blocks required to store data blocks associated with a data access request may be reduced relative to conventional non-adaptive mapping techniques.

Consider an example where eight LBA storage slots are mapped to each physical block within data storage device 16. Then, consider a data access request that requests access to a sequence of eight LBAs. Using conventional techniques, it is possible that the eight LBA data blocks associated with the data access request may overlap between two different physical blocks within data storage device 16. However, the novel mapping alignment techniques described in this disclosure may, in some circumstances, adjust the mapping such that the eight LBA data blocks are stored within a single physical block. Thus, the number of physical data blocks accessed for a given data access request may be reduced, thereby reducing the number of physical data block read/write operation required to service a data access request. In this example, the number of physical data block access operations is reduced by 50%, which can provide substantial improvement in data access latency.

Moreover, the amount of free storage space within data storage device 16 may be increased because each time the eight LBA blocks associated with the data access request need to be rewritten to the data storage device, only a single physical data block (rather than two data blocks) needs to be marked as invalid. Thus, the techniques in this disclosure may also reduce garbage collection overhead within data storage device 16.

In further examples according to this disclosure, translation unit 14 may be configured to receive partitioning information that divides an LBA space into a plurality of LBA partitions. In some examples the partitioning information may be received from host device 12. Translation unit 14 may define translation maps for each of the LBA partitions, obtain offset data for data access requests associated with each of the LBA partitions, determine an alignment offset for each of the partitions based on the offset data, and adjusting the translation maps for each of the partitions based on the alignment offset corresponding to the respective partition. In some systems, different partitions or zones of an LBA space may have different alignment signatures. By adjusting the translation map for each of the partitions independently of the other partitions, translation unit 14 is able to accommodate variations in alignment between different partitions or zones of the LBA space.

In some examples, translation unit 14 may be implemented as hardware, firmware, or software within a controller for data storage device 16. In additional examples, translation unit 14 may be implemented as part of the operating system and/or device driver software of host device 12. In further examples, all or a part of translation unit 14 may be implemented as a computer-readable storage medium comprising computer-readable instructions, which when executed by one or more processors, cause the one or more processors to perform the mapping alignment techniques described herein.

In some examples, a single device may include both host device 12 and translation unit 14. In additional examples, a single device may include both translation unit 14 and data storage device 16. In further examples, a single device may include host device 12, translation unit 14, and data storage device 16. Thus, in some examples, one or more of host device 12, translation unit 14, and data storage device 16 may be implemented within a single computing device.

In examples where data storage device 16 is a solid-state storage device, translation unit 14 may be implemented as a Flash Translation Layer within a solid-state storage device controller. In such examples, the translation map alignment techniques of this disclosure may be implemented in addition to other features that are part of the standard Flash Translation Layer specification.

Data storage device 16 is configured to store and retrieve data blocks for host device 12. Data storage device 16 receives read, write, and erase commands from translation unit 14, and provides data and/or control information in response to performing read, write, and erase operations. Data storage device 16 may provide the data and/or control information to either host device 12 or translation unit 14.

In some examples, data storage device 16 may comprise a block-storage device. In such examples, data storage device 16 stores data in a plurality of physical data blocks, which are individually addressed by using a physical block address. In some examples, the physical data blocks may be the smallest addressable data unit that can be read from and/or written to in data storage device 16. In some examples, the physical block address may correspond to a page address within a Flash solid-state drive. In additional examples, the physical block address may correspond to the combination of an erasure block address and page offset into the erasure block of a Flash solid-state drive.

Data storage device 16 may, in some examples, use an erase-before-overwrite scheme for writing data to data storage device 16. In such examples, a physical data block that has data already written to it may need to be erased prior to overwriting the old data with new data. To facilitate erasure operations, each physical data block may have an erased state indicator, which indicates whether the physical data block is currently in an erased state or a written state. When the data block is in an erased state (i.e., a non-written state or blank state), no data has been written to the physical data block since the physical data block's most recent erasure. When the data block is in a written state (i.e., a non-erased state), data has been written to the physical data block since the physical data block's most recent erasure. Thus, when in the written state, the physical data block will need to be erased prior to overwriting data into the physical data block.

In data storage devices 16 that use the erase-before-overwrite scheme described above, the smallest addressable unit that can be erased during a single erasure operation may be referred to as an erasure block. In some examples, each physical block may correspond to an erasure block. In other examples, the erasure block may be larger than the physical data block. In other words, in such examples, a single erasure block may include multiple physical data blocks. When an erase operation is performed by data storage device 16, each physical data block within the erasure block is erased. Thus, in order to overwrite data within an individual physical data block, all physical data blocks within the erasure block must first be erased.

In many cases, the LBA range associated with an individual write access request may not include all physical data blocks within an erasure block of data storage device 16. Such an erasure block may be referred to as a partially-covered erasure block with respect to the write access request. Thus, when physical data blocks corresponding to the LBAs within the individual write request need to be overwritten, additional steps must be taken to safeguard the physical data blocks within partially-covered erasure blocks that do not correspond to LBAs within the LBA range of the write access request.

In some examples, data storage device 16 may deal with such a write access request by reading all of the physical data blocks within partially-covered erasure blocks including physical data blocks that do not correspond to the LBAs within the LBA range of the write access request. The physical data blocks may then be stored in a local memory of translation unit 14. After reading all of the physical data blocks, translation unit 14 may modify the physical data blocks in the local memory that correspond to LBAs within the LBA range of the write access request. Translation unit 14 may also issue an erase command to erasure blocks that associated with the LBA range. Finally, translation unit 14 may issue a write command to write the modified set of physical data blocks to the corresponding erasure blocks within data storage device 16. Although the local memory was described above as being located in translation unit 14, in other examples, the local memory may be located in host device 12 or in data storage device 16 and such devices may perform the operations described above with respect to translation unit 14.

In other examples, translation unit 14 may deal with a write access request that only writes to a portion of the physical data blocks within an erasure block by writing the new data blocks associated with the LBA range of the write request to physical data blocks that are already in the erased state. The physical data blocks may be contained within the same erasure block as the original physical data block or in another erasure block. Translation unit 14 may then remap the LBAs to correspond to their respective new physical data blocks. To facilitate the remapping process, each physical data block may have a valid status indicator. The old physical data blocks previously mapped to the LBAs may be marked as invalid blocks that are ready for garbage collection. In contrast, physical data blocks that are still mapped to LBAs are marked as valid data blocks.

In data storage devices 16 that use the erase-before-overwrite scheme, translation unit 14 may employ garbage collection techniques to manage the storage space within data storage device 16. In general, garbage collection routines periodically reorganize the storage space to erase invalid data blocks while keeping valid data blocks. In some examples, the process of reorganizing the storage space may involve moving valid data blocks and remapping LBAs associated with these data blocks to new PBAs such that the storage space is more efficiently allocated. In some examples, the moving of valid data blocks may involve consolidating valid data blocks into contiguous sequences of physical data blocks by removing any invalid data blocks interspersed within the sequence of physical data blocks. By periodically erasing invalid data blocks and consolidating valid data blocks, a garbage collection routine allows for improved memory space allocation, which can effectively increase the overall free space of data storage device 16. In addition, consolidation of valid data blocks can result in fewer access operations required to service data access requests.

Since the mapping alignment techniques in this disclosure can achieve better alignment between starting LBAs of data access requests and starting storage slots of PBAs within a data storage device relative to conventional mapping techniques, the number of physical blocks required to store data blocks associated with a data access request may be reduced relative to conventional mapping techniques. Thus, by using the mapping alignment techniques of this disclosure, the number of invalid blocks within the data storage device may be reduced. Therefore, the amount of free storage space within the data storage device may be increased, because each time the physical blocks associated with the data access request need to be rewritten, a reduced number of physical blocks must be marked as invalid. In addition, a higher amount of free space and less invalid blocks may also lead to a reduced garbage collection overhead within the data storage device.

In some examples, data storage device 16 may be a solid-state data storage device. The solid-state data storage device may, in some examples, be a block-storage solid-state storage device. For example, data storage device 16 may be a an Electrically Erasable Programmable Read-Only Memory (EEPROM) device, a Flash solid-state storage device, a NAND Flash solid-state drive, a NOR Flash solid-state drive.

Flash solid-state drives often utilize the erase-before-overwrite scheme. When data storage device 16 is a flash solid-state drive, the physical blocks may correspond to pages within the flash device, and the PBA may correspond to the page address within the flash device. In some cases, the page address may include an erasure block address and a page offset within the erasure block.

One type of flash solid-state drive is a NAND flash drive. NAND flash drives usually require a greater amount of time to perform erase operations than to perform read and write operations. Thus, for many NAND flash drives, a single erasure operation will erase multiple physical data blocks in order to increase efficiency. The mapping alignment techniques described in this disclosure have the potential to reduce the number of physical blocks associated with a range of LBAs within a data access request. In this manner, the mapping alignment techniques of this disclosure may reduce the number of read/write operations required to service a data access request, increase the overall amount of free space within the flash device, and/or reduce the amount of garbage collection required.

During operation of data access system 10, host device 12 may transmit read and write access requests to translation unit 14. Translation unit 14 receives data access requests, translates the LBA range within the data access request to a set of PBAs to generate a translated data access request, and transmits the translated data access request to data storage device 16. In some examples, the translated data access request may contain index information that identifies particular storage slots within the physical blocks of data storage device 16 corresponding to the data access request.

Data storage device 16 processes the data access request. If the data access request is a read access request, data storage device 16 transmits the data corresponding to the PBA range in the translated data access request to translation unit 14. In some examples, data storage device 16 may also transmit control information, such as a read successful/unsuccessful indicator, to translation unit 14. If the data access request is a write access request, data storage device 16 may transmit control information, such as a write successful/unsuccessful indicator, to translation unit 14. In some examples, rather than transmitting data and/or control information to translation unit 14, data storage device 16 may transmit all or part of this information directly to host device 12. In examples where translation unit 14 receives data and/or control information from data storage device 16, translation unit 16 relays the information to host device 12. In general, control information may include acknowledgments, error indicators, command successful/unsuccessful indicators, or other information that indicates the status of the data access command.

Although data access system 10 has been illustrated with a host device 12 coupled to a translation unit 14, which is in turn is coupled to a data storage device 16, it should be noted that any number of devices and/or modules may be included between host device 12 and translation unit 14 as well as between translation unit 14 and data storage device 16.

Figure 2:
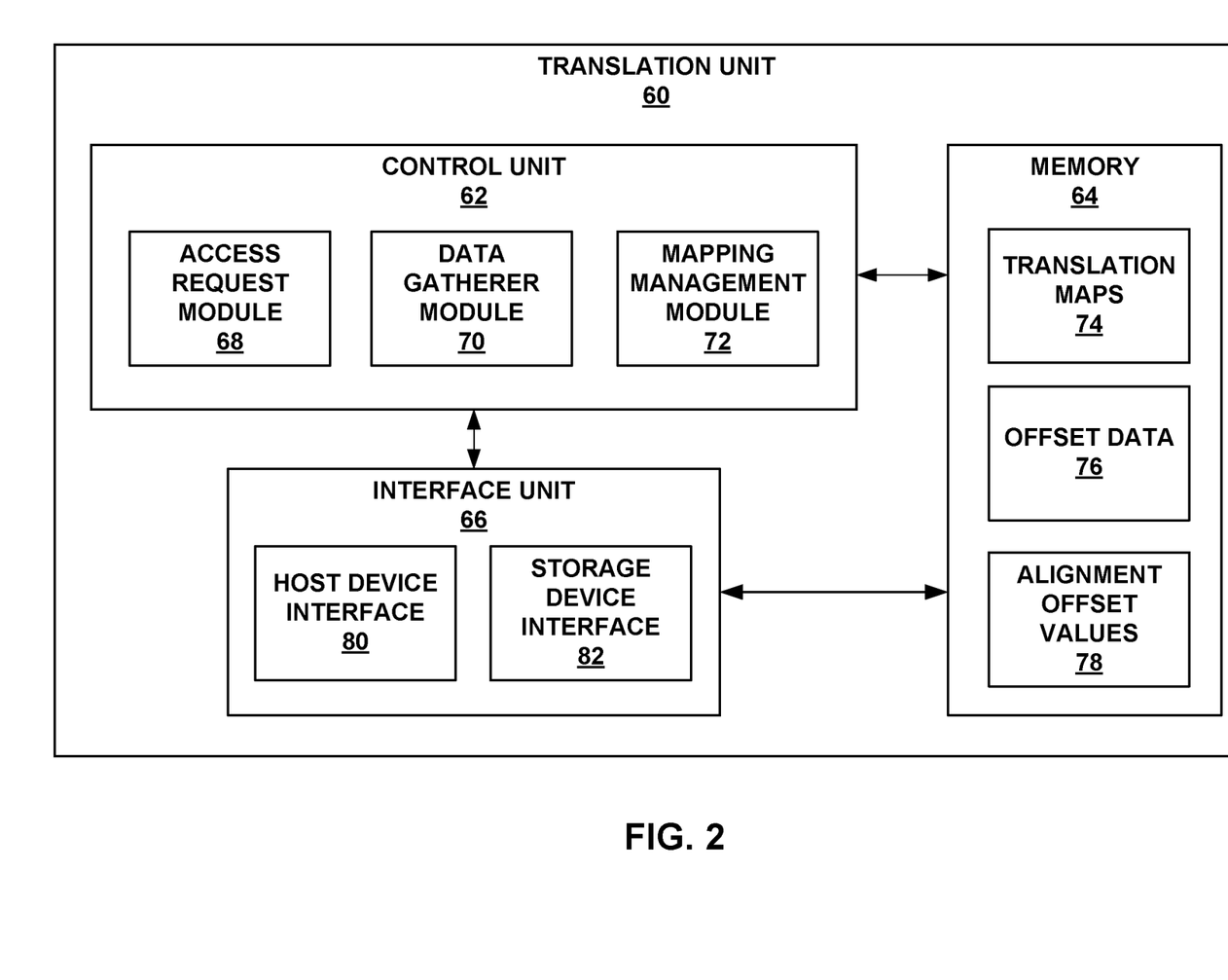
FIG. 2 is a block diagram of a translation unit for use within the data access systems of FIG. 1, according one aspect of the present invention.

FIG. 2 is a block diagram of a translation unit 60 for use within data access system 10 of FIG. 1 according one aspect of the present invention. Translation unit 60 is configured to process data access requests, and manage translation maps used for converting addresses within an LBA space to addresses within a PBA space. Translation unit 60 includes control unit 62, memory unit 64, and interface unit 66. Translation unit 60 may be one example of translation unit 14 shown in FIG. 1.

Control unit 62 is configured to control operations pertaining to data access request processing and translation map management. Control unit 62 includes access request module 68, data gatherer module 70, and mapping management module 72. Memory unit 64 is configured to store translation maps 74, offset data 76, alignment offset values 78, and other information to assist control unit 62 in processing data access requests and managing translation maps. Interface unit 66 is configured to provide communication between host device 12 (FIG. 1) and data storage device 16 (FIG. 1). Interface unit 66 includes host device interface 80 and storage device interface 82.

Access request module 68 is configured to process data access requests received from host device interface 80. The data access requests may include read access requests and write access requests issued by a host device. Access request module 68 may identify an LBA range within the data access request. Access request module 68 may then translate the LBAs within the identified LBA range into a set of PBAs. In some examples, access request module 68 may translate each LBA to a PBA and to a storage slot index associated with the PBA. Access request module 68 may repackage the set of PBAs and/or storage slot indices into a read command or write command for transmission to a data storage device via interface unit 66.

Data gatherer module 70 is configured to collect offset data based on data access requests received from host device interface 80. In some examples, the offset data information may include information relating to the indices to which starting LBAs of the access requests are mapped. In additional examples, the offset data may include information relating to a remainder operation applied to a dividend and divisor for each access request. In such examples, the dividend for each access request may be a starting LBA for the access request, and the divisor for each access request may be a number of LBA storage slots within each physical block associated with a physical block address (PBA) space.

A sequence of storage slots may be associated with each physical block within the data storage device. The data capacity of a single storage slot may be substantially equal to the data required to store data associated with a single LBA data block. In such examples, translation maps 74 may map each LBA to a PBA and to a storage slot index associated with the PBA. The storage slot index may indicate the order that the LBA data block is stored within the physical block relative to other LBA data blocks stored within the same physical block.

Data gatherer module 70 is further configured to determine offset values associated with individual data access requests. In some examples, the offset value for a data access request may be equal to the index assigned to the data access request. In such examples, the index assigned to a data access request indicates a particular storage slot within an ordered sequence of storage slots to which the starting LBA of the data access request is mapped. Data gatherer module 70 may determine the index assigned to a particular data access request using translation maps 74, or by relying upon the determination of the index made by access request module 68.

In other examples, the offset value associated with a data access request may be equal to a remainder operation applied to a dividend and divisor for each access request. The dividend for each access request may be a starting LBA for the access request, and the divisor for each access request may be a number of LBA storage slots within each physical block associated with a physical block address (PBA) space. In some cases, a constant may be added to the quotient to determine the offset value. For examples, the constant may correspond to a previously determined alignment offset for the LBA space.

Offset data 76 may contain information relating to offset values for a plurality of data access requests. In some examples, offset data 76 may contain individual offset values for a plurality of data access requests associated with a given LBA space. In other examples, offset data 76 may include a counter array associated with a given LBA space. Each element (i.e., counter value) within the counter array may be associated with a particular index value. The size of the counter array may be equal to the number of storage slots associated with a single physical block. In some examples, the counter array size may be equal to the data capacity of a physical block divided by the data capacity of a logical block. In such examples, the division operation refers to integer division.

The counter array may be initialized such that all array elements are equal to zero. Then, data gatherer module 70 may update the counter array elements each time a new read or write request is received. For example, when offset data 76 includes a counter array and translation unit 60 receives a data access request, data gatherer module 70 may determine an offset value associated with the starting LBA of the access request, and identify the counter array element that corresponds to the offset value. Data gatherer module 70 may then increment the counter value of the counter array element to indicate that another data access request has been received with that particular offset value.

As an example application, consider a NAND flash data storage device with 4 KB long pages (i.e., physical blocks). The length of the counter array is equal to the number of sectors (i.e., logical blocks) inside a flash page. Thus, if the logical data block size is 512 bytes, then eight logical blocks may be mapped to a single physical block within the data storage device since 4 kB=8*512 bytes.

When a data access request is received, data gatherer module 70 may determine a counter array element to increment. In general, the counter array element to be incremented is the page sector length modulus (mod) the starting LBA of the command. Once a threshold number of data access requests have been recorded within the counter array, or when the data access requests have been recorded for a threshold amount of time, mapping management module 72 may update the translation map.

Data gatherer module 70 may collect offset data 76 continuously or only during certain time periods based on instructions from mapping management module 72. In some examples, data gatherer module 70 may periodically gather data at regular time intervals. Data gatherer module 70 may use timers and/or control variables to determine when to gather the data. Data gatherer module 70 may store timers and control variables in registers and/or memory 64.

In some examples, data gatherer module 70 may save the counter values to log entries, which may be later accessed by mapping management module 72. Then, mapping management module can determine historical trends, and adjust the mapping alignment based on the historical trends.

Mapping management module 72 is configured to manage translation maps 74 and alignment offset values 78 in memory 64. In order to manage translation maps 74, mapping management module 72 may define and/or adjust translation maps 72 based on offset data 76 in order to improve alignment between data access requests and physical data blocks.

In some examples, mapping management module 72 may determine an alignment offset for an LBA space based on offset data 76. In general, the alignment offset may correspond to the offset data for a subset of the plurality of access requests. Mapping management module 72 may determine the alignment offset by performing statistical processing upon the offset data to determine a "most likely" offset value for the LBA space. In some examples, mapping management module 72 may select the most frequently occurring offset value for the data access requests to assign as the alignment offset for the LBA space. In examples where the offset data 76 includes a counter array, mapping management module 72 may select the index associated with the array element that has the highest or largest counter value, and assign the selected index as the alignment offset value for the LBA space. In other examples, mapping management module 72 may perform a mathematical calculation on the array element values to determine which array index to select.

Mapping management module 72 may receive instructions from a host device via host device interface 80 to partition and/or repartition an LBA space into a set of partitions or zones. In response to such an instruction, mapping management module 72 may generate a translation map 74 for each partition or zone. In cases where mapping management module 72 determines an alignment offset 78, mapping management module may determine an alignment offset 78 for each partition.

In additional examples, mapping management module 72 may determine an alignment offset for each zone or partition of an LBA space based on offset data 76 associated with the respective zone or partition. Each zone or partition may form an LBA space or sub-space within the overall LBA space. Mapping management module 72 may then adjust the translation map for each partition based on the alignment value for the partition.

In some examples, mapping management module 72 may be configured to periodically update translation maps 74. In such examples, memory management module 72 may instruct data gatherer module 70 to collect offset data for an LBA space for a threshold period of time or for a threshold number of data access requests associated with the LBA space. In some examples, memory management module 72 may program timers and/or control variables associated with data gatherer module 70. Then, memory management module 72 may adjust the translation map 74 for the LBA space based on the collected offset data 76.

In additional examples, a host device may instruct mapping management module 72 to update translation maps 74 via host device interface 80. For example, host device 12 (FIG. 1) may instruct mapping management module 72 to collect data and update the translation maps when data storage device 16 is repartitioned or when the file system within data storage device 16 is reformatted.

Host device interface 80 is configured to provide communications between a host device (e.g., host device 12 shown in FIG. 1) and translation unit 60. Host device interface 80 may receive data access requests and data blocks from a host device, and transmit data and/or control information back to the host device. In some examples, host device interface 80 may communicate according to protocols such as, for example, Advanced Technology Attachment (ATA), Serial Advanced Technology Attachment (SATA), Small Computer System Interface (SCSI), Serial Attached SCSI (SAS), Internet Small Computer System Interface (iSCSI), Fibre Channel (FC), or any other means or protocol through which a host device may communicate with a data storage device.

Storage device interface 82 is configured to provide communications between a data storage device (e.g., data storage device 16 shown in FIG. 1) and translation unit 60. Storage device interface 82 may transmit read, write, and erase commands and data blocks to the data storage device, and receive data blocks and/or control information from data access device. In some examples, storage device interface 82 may communicate according to an open or proprietary interface designed for a specific data storage device. In some examples, the open interface may include any of the interfaces specified above with respect to the host device interface 80.

Figure 3:
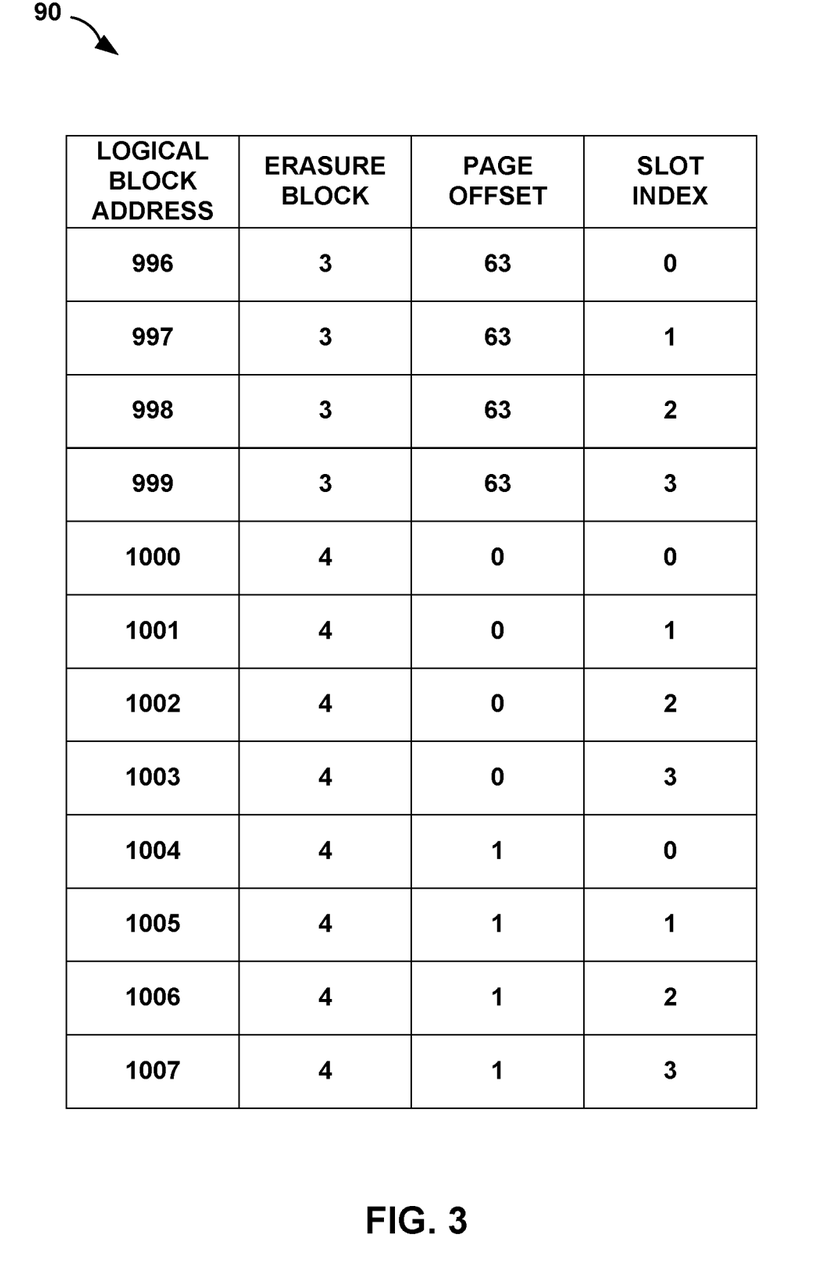
FIG. 3 is a block diagram of a translation map according to one aspect of the present invention.
Figure 4:
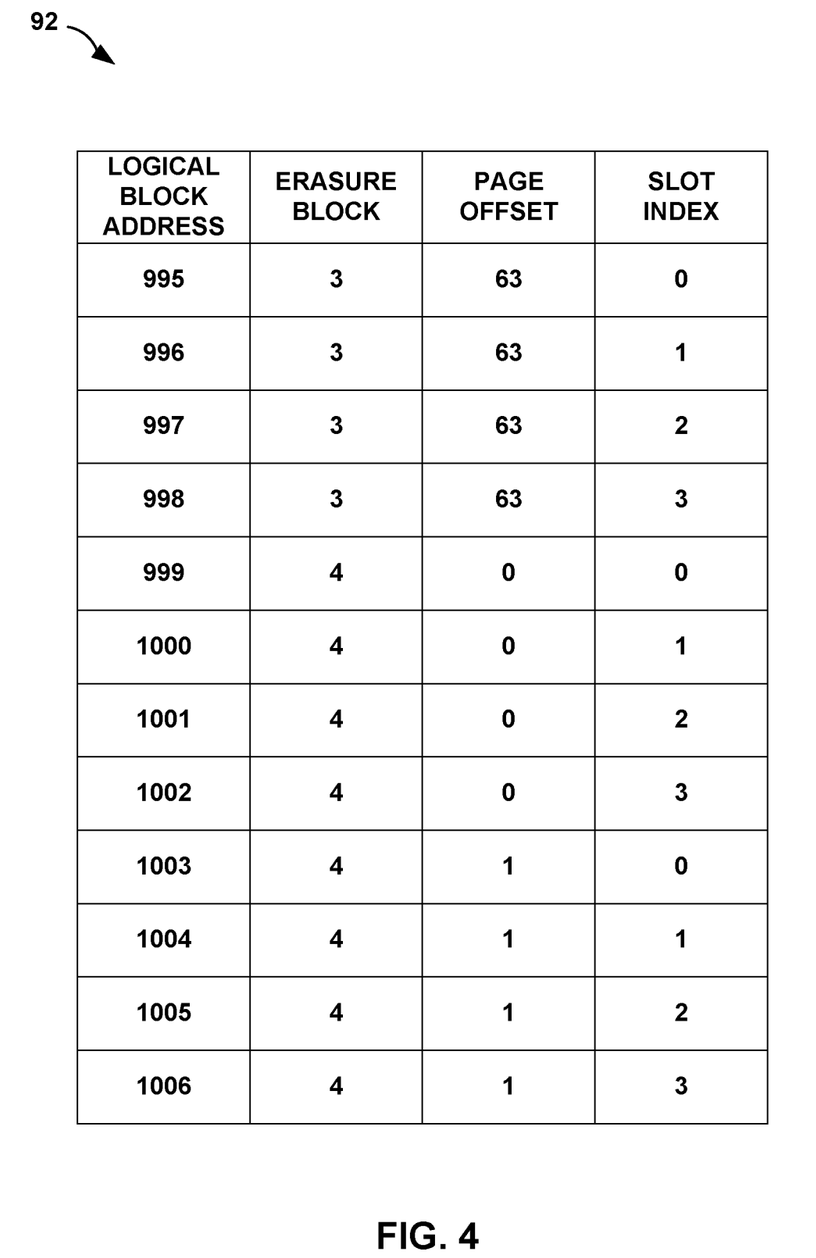
FIG. 4 is a block diagram of an adjusted translation map according to one aspect of the present invention.

FIGS. 3 and 4 are block diagrams of translation maps 90, 92 according to one aspect of the present invention. Translation maps 90, 92 include a logical block address (LBA) field, an erasure block field, a page offset field, and a slot index field.

Each row in translation maps 90, 92 represents a mapping between an LBA within the LBA field and a PBA. In some examples, a PBA field may be defined as the page offset field. In other examples, a PBA field may be defined as the combination of the erasure block field and the page offset field. Each row within translation maps 90, 92 may also represent a mapping between an LBA within the LBA field and a slot index, which indicates a storage slot within a sequence of storage slots associated with the PBA.

Translation map 92 has a structure that is substantially similar to translation map 90 except that the mapping values have been adjusted. The example translation maps 90, 92 depicted in FIGS. 3 and 4 may be used as the translation map for a NAND-type flash drive. In such a drive, a page may be the basic unit for read and write operations (i.e., a physical block). In NAND-type flash drives, with current technology a page is typically 2 KB or 4 KB in size.

Host devices, such as storage controllers and drivers, access block storage devices, such as hard drives, in units of sectors (i.e., logical blocks). Typically the length of a hard drive sector is 512 bytes. Since the page size in NAND-type flash drives is generally greater than the size of a hard drive sector, multiple sectors can be stored on a single NAND-flash page. Thus, translation unit 60 is needed to translate flash memory pages and hard drive sectors and vice versa for the software that accesses the flash drive.

Often, it is case that software applications and file systems access data from a storage device in the form of data blocks, which have a size that is an integer multiple of the logical sector size. For example, database software may often access data at 4 KB or 8 KB. A typical New Technology File System (NTFS) may use 2 KB or 4 KB for format a hard drive partition.

Data access requests sent to hard-drive storage device and to storage devices that are compatible with a hard drive interface are generally described in terms of starting LBA and transfer length. The transfer length is typically a multiple of sectors or logical blocks. But the starting LBA of a data access request may have very different alignment values from system to system, or even from partition to partition of the same logical hard drive.

For example, a hard drive partition tool or volume manager may reserve the first 63 sectors (i.e., sector 0 through 62) for management of metadata. In this case, a file system for real user data may start at sector 63, which can lead to file access pattern aligned at m=n*4−1 where m is an integer, and n is the start LBA for a read or write access request.

FIG. 3 and FIG. 4 show two different translation maps for the NAND-type flash drive. The erasure block to page offset mapping is identical for both of the translation maps. However, the LBA to page mapping is different by one between the two translation maps. For example, in translation map 90, LBA 999 is mapped to page 63 inside erasure block 3. In translation map 92, LBA 999 is mapped to page 0 inside erasure block 4.

As an example, consider a write access request having a starting LBA of 999 and a transfer length of 2 KB. Since the transfer length for the write access request is 2 KB, the data storage device will need to access data blocks associated with LBAs 999-1002. If translation map 90 is applied, the data storage device will need to access page 63 in erasure block 3 and page 0 in erasure block 4. In contrast, if translation map 92 is applied, the data storage device will only need to access to page 0 within erasure block 4.

As another example, consider a read access request having a starting LBA of 1003 and a transfer length of 2 KB. If translation map 90 is applied, the data storage device will need to access pages 0 and 1 in erasure block 4. In contrast, if translation map 92 is applied, the data storage device will only need to access to page 1 within erasure block 4. These examples illustrate that by properly aligning the starting LBA to the beginning storage slot of a physical block (i.e., page), the number of physical block access operations can be reduced, which can in turn improve data access latency.

The mapping algorithm can be adapted to reflect the counter values under a certain algorithm so that the layout is such that the unaligned accessing of data (e.g., data access requests that span across a page or an erasure block boundary) is minimized. With fewer read, write or erasure operation on flash chips to satisfy the same amount of information request, performance and longevity are improved over unaligned accessing.

The translation maps 90, 92 depicted in FIGS. 3 and 4 are merely exemplary. Other translation maps are possible that have different fields, as well as more or less fields. As one example, although translation maps 90, 92 in FIGS. 3 and 4 depict a slot index field, other types of translation maps may not contain a slot index field. For example, the storage slot index may be implied by the ordering of the rows in the translation map. As another example, some types of translation maps may not contain an erasure block field. In such examples, translation map 90 may have an LBA field and a PBA field (i.e. page offset field).

Figure 5:
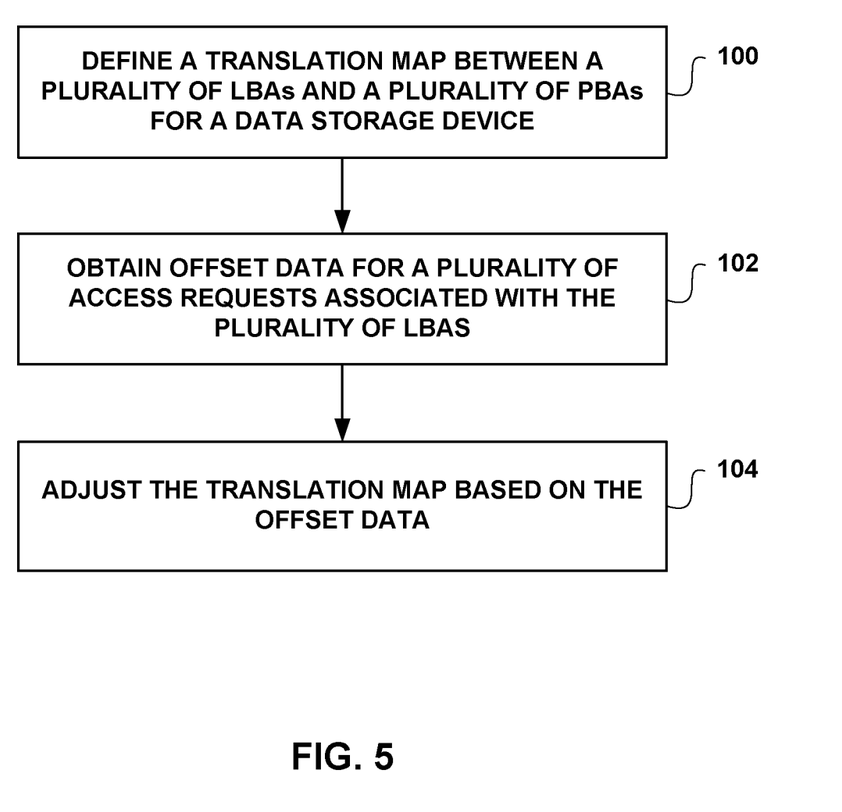
FIG. 5 is a flow diagram illustrating a method of adjusting a translation map based on offset data for a plurality of access requests according to one aspect of the present invention.

FIG. 5 is a flow diagram illustrating a method of adjusting a translation map based on offset data for a plurality of access requests according to one aspect of the present invention. As one example, the techniques depicted in FIG. 5 may be implemented with translation unit 60 shown in FIG. 2.

As shown in FIG. 5, translation unit 60 defines a translation map between a plurality of LBAs and a plurality of PBAs for a data storage device (100). Translation unit 60 obtains offset data for a plurality of access requests associated with the plurality of LBAs (102). The offset data may include information relating to the indices to which starting LBAs of the access requests are mapped. Translation unit 60 adjusts the translation map based on the offset data (104).

Figure 6:
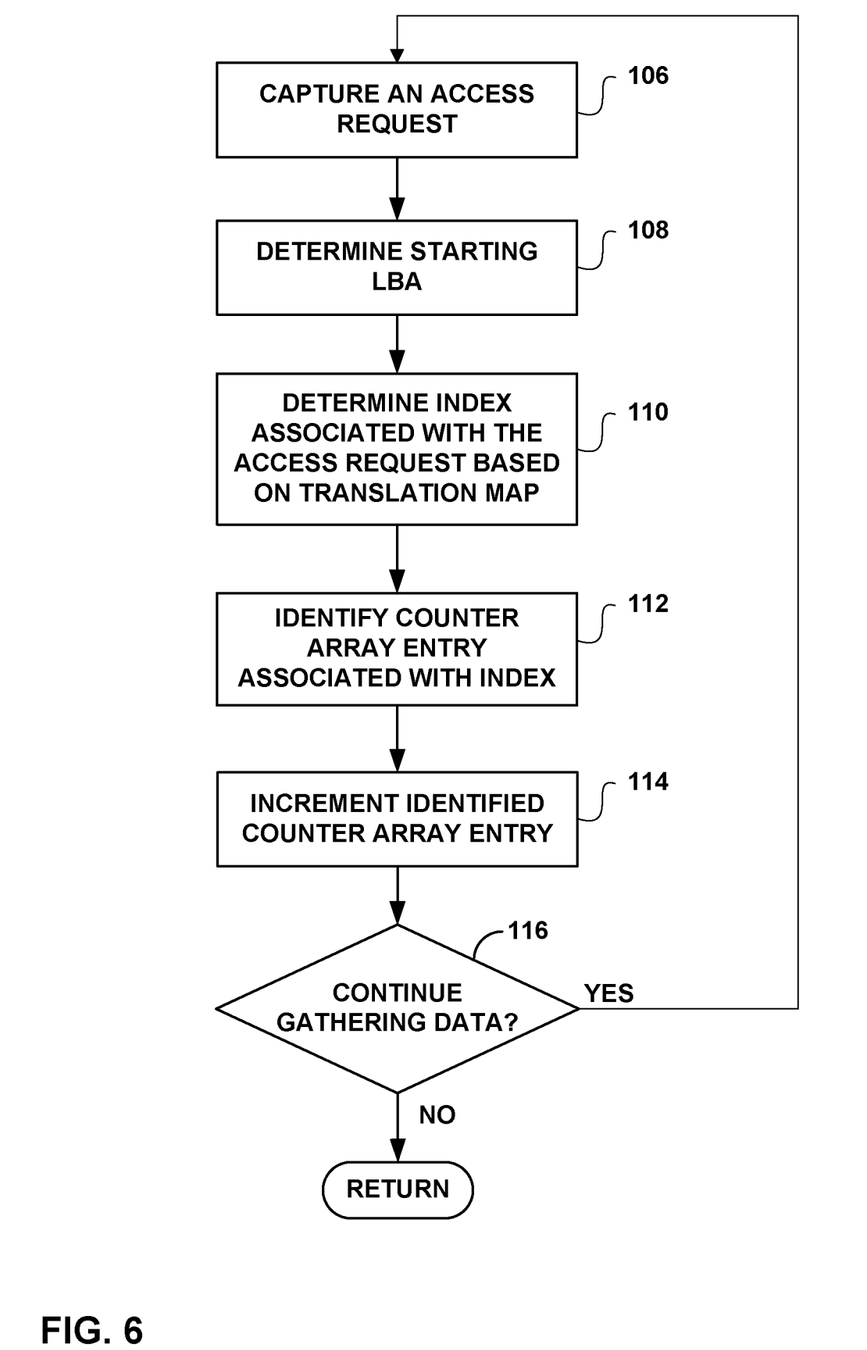
FIG. 6 is a flow diagram illustrating a method of obtaining offset data according to one aspect of the present invention.

FIG. 6 is a flow diagram illustrating a method of obtaining offset data according to one aspect of the present invention. As one example, the techniques depicted in FIG. 6 may be used to implement act 102 depicted in FIG. 5.

As shown in FIG. 6, translation unit 60 captures a data access request (106). Translation unit 60 determines a starting LBA for the data access request (108). The starting LBA may be a first LBA within a range or sequence of LBAs associated with the data access request. Translation unit 60 determines an index associated with the data access request based on translation map (110). Translation unit 60 identifies a counter array entry associated with index (112). Translation unit 60 increments the identified counter array entry (114).

After incrementing the appropriate counter, translation unit 60 determines whether to continue gathering data (116). If translation unit 60 determines that more data should be gathered, translation unit returns to step 106 to process additional data access requests. If translation unit 60 determines that no more data should be gathered, translation unit ends the process of obtaining offset data. In some examples, translation unit may return to step 104 in FIG. 5.

In some examples, translation unit 60 may determine to cease gathering data when the number of data access requests processed is greater than a threshold number of data access requests. If the number of data access requests processed is less than the threshold, translation unit 60 may continue to process data access requests. In some examples, the threshold number of data access requests may be a predetermined threshold for a particular data storage device or for a particular mapping adjustment algorithm. In additional examples, the threshold number of data access requests may be based on criteria such as, the age of the flash chip or the result of analyzing past trends of data access patterns.

In additional examples, translation unit 60 may determine to cease gathering data when the elapsed time for gathering offset data since commencement of the data gathering process is greater than a threshold. If the amount of time is less than the threshold, translation unit 60 may continue to process data access requests. In some examples, the threshold number of data access requests may be a predetermined threshold for a particular data storage device or for a particular mapping adjustment algorithm. In some examples, the threshold may be a relative clock time or absolute clock time.

Figure 7:
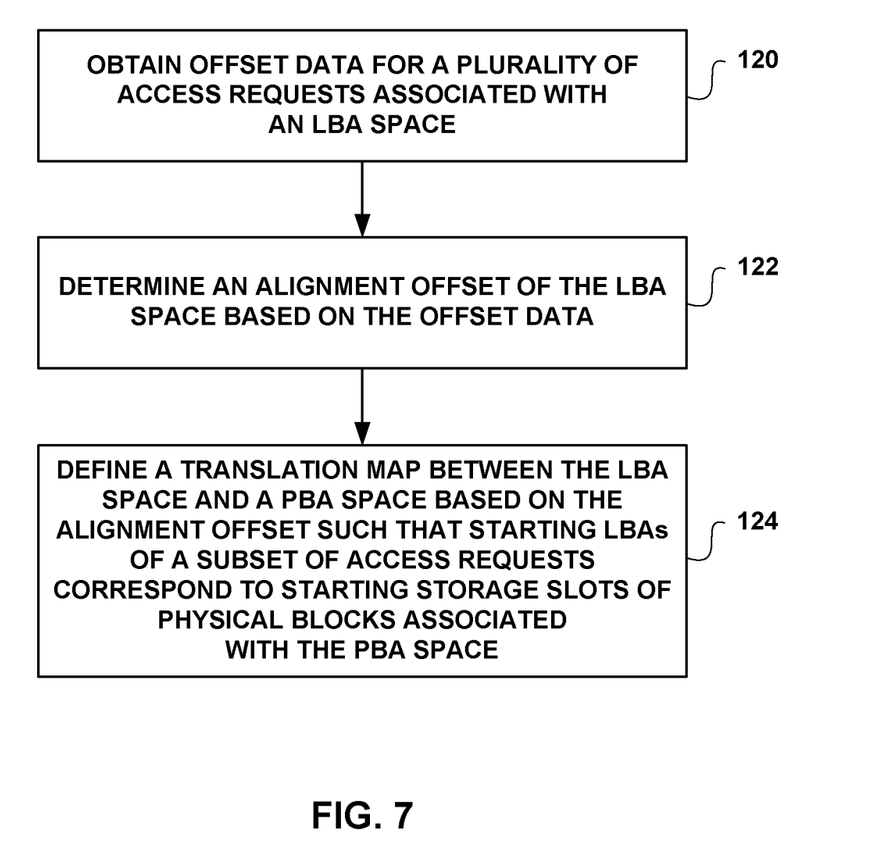
FIG. 7 is a flow diagram illustrating a method of defining a translation map based on offset data for a plurality of access requests according to one aspect of the present invention.

FIG. 7 is a flow diagram illustrating a method of defining a translation map based on offset data for a plurality of access requests according to one aspect of the present invention. As one example, the techniques depicted in FIG. 7 may be implemented with translation unit 60 shown in FIG. 2.

As shown in FIG. 7, translation unit 60 obtains offset data for a plurality of access requests associated with an LBA space (120). In some examples, the offset data may include information relating to a remainder operation applied to a dividend and divisor for each access request. In such examples, the dividend for the remainder operation is a starting LBA for the access request, and the divisor for the remainder operation is a number of LBA storage slots within each physical block associated with a physical block address (PBA) space.

Translation unit 60 determines an alignment offset of the LBA space based on the offset data (122). In some examples, the alignment offset corresponds to the offset data for a subset of the plurality of access requests. Translation unit 60 defines a translation map between the LBA space and a PBA space based on the alignment offset such that starting LBAs of a subset of access requests correspond to starting storage slots of physical blocks associated with the PBA space (124).

Figure 8:
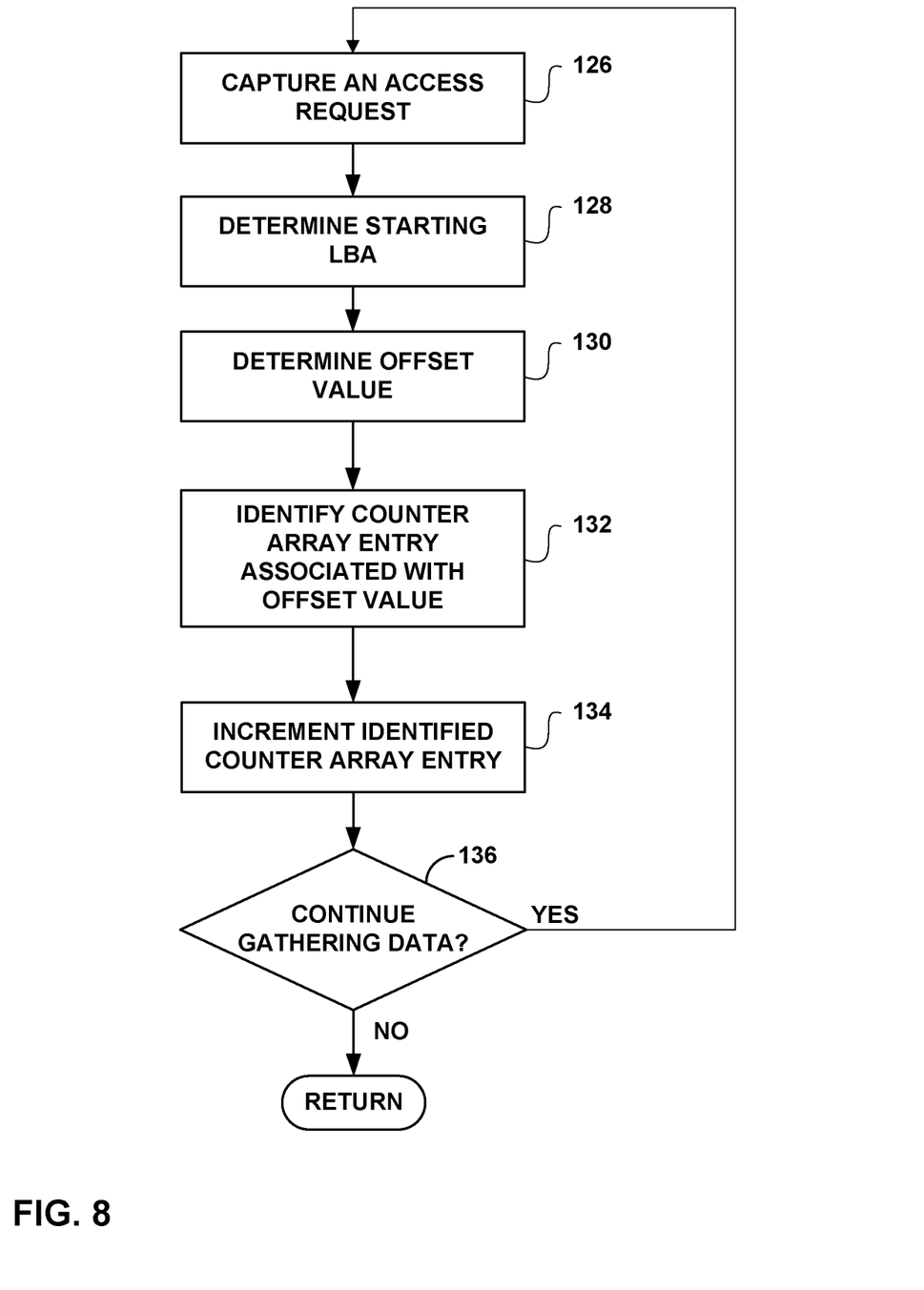
FIG. 8 is a flow diagram illustrating a method of obtaining offset data according to one aspect of the present invention.

FIG. 8 is a flow diagram illustrating a method of obtaining offset data according to one aspect of the present invention. As one example, the techniques depicted in FIG. 6 may be used to implement step 122 depicted in FIG. 7.

Translation unit 60 captures an access request (126). Translation unit 60 determines a starting LBA for the access request (128). Translation unit 60 determines an offset value associated with the starting LBA of the access request (130). In some examples, the offset value may be an intrinsic offset value. In other words, the offset value may be calculated without reference to a defined translation map. Translation unit 60 identifies a counter array entry associated with offset value (132). Translation unit 60 increments the identified counter array entry (134).

After incrementing the appropriate counter, translation unit 60 determines whether to continue gathering data (136). If translation unit 60 determines that more data should be gathered, translation unit returns to step 126 to process additional data access requests. If translation unit 60 determines that no more data should be gathered, translation unit ends the process of obtaining offset data. In some examples, translation unit may return to step 124 in FIG. 7.

In some examples, translation unit 60 may determine to cease gathering data when the number of data access requests processed is greater than a threshold number of data access requests. If the number of data access requests processed is less than the threshold, translation unit 60 may continue to process data access requests. In some examples, the threshold number of data access requests may be a predetermined threshold for a particular data storage device or for a particular mapping adjustment algorithm. In additional examples, the threshold number of data access requests may be based on criteria such as the age of the flash chip or the result of analyzing past trends of data access patterns.

In additional examples, translation unit 60 may determine to cease gathering data when the elapsed time for gathering offset data since commencement of the data gathering process is greater than a threshold. If the amount of time is less than the threshold, translation unit 60 may continue to process data access requests. In some examples, the threshold number of data access requests may be a predetermined threshold for a particular data storage device or for a particular mapping adjustment algorithm. In some examples, the threshold may be a relative clock time or absolute clock time.

The techniques described in this disclosure may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware, or any combination thereof. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-media applications and devices. In some aspects, for example, such components may form part of a mobile device, such as a wireless communication device handset.

If implemented in software, the techniques may be realized at least in part by a computer-readable data storage medium comprising code with instructions that, when executed by one or more processors, performs one or more of the methods described above. The computer-readable storage medium may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated and discrete logic circuitry.

The implementations described above and other implementations are within the scope of the following claims.

The invention claimed is:

1. A method comprising:
defining a translation map between a plurality of logical block addresses (LBAs) and a plurality of physical block addresses (PBAs) for a solid-state data storage device, wherein each PBA is associated with a sequence of storage slots, and wherein the translation map maps each of the LBAs to a PBA and to an index of a storage slot associated with the PBA;
obtaining offset data for a plurality of access requests associated with the plurality of LBAs until a number of data access requests is greater than a threshold number that is based on an age of the data storage device or on past data access trends, wherein the offset data includes information relating to the indices to which starting LBAs of the access requests are mapped;
updating a translation map between the LBA space and the PBA space during system operation based on the offset data to increase alignment between starting LBAs of data access requests and starting indices of the storage slots.

2. The method of claim 1, wherein obtaining the offset data comprises forming a counter array having a number of array elements equal to a number of storage slots within the sequence of storage slots associated with each PBA, wherein each array element tracks a number of access requests within the plurality of access requests that have a particular offset value, and wherein updating the translation map comprises performing statistical processing upon the particular offset values to determine a most likely offset value for the LBA space.

3. A method comprising:
defining a translation map between a plurality of logical block addresses (LBAs) and a plurality of physical block addresses (PBAs) for a solid-state data storage device, wherein each PBA is associated with a sequence of storage slots, and wherein the translation map maps each of the LBAs to a PBA and to an index of a storage slot associated with the PBA;
forming a counter array having a number of array elements equal to a number of storage slots within the sequence of storage slots associated with each PBA, wherein each array element tracks a number of access requests within a plurality of access requests that have a particular offset value;
applying a remainder operation to a dividend and divisor for each of the plurality of access requests, wherein the dividend for each access request is a starting LBA for the access request, wherein the divisor for each access request is a number of LBA storage slots within each physical block associated with a PBA space, wherein the results of the remainder operations are obtained until a number of the data access requests is greater than a threshold number, and wherein the threshold number is based on an age of the data storage device or on a result of analyzing past trends of data access patterns;
for each result of the remainder operation, incrementing a respective one of the array elements that correspond to the result of the remainder operation;
analyzing the counter array to determine an alignment offset for an LBA space defined by the plurality of LBAs; and
adjusting the translation map based on the alignment offset during system operation.

4. The method of claim 3, wherein analyzing the counter array comprises selecting an offset value corresponding to an array element having a largest counter value as the alignment offset for the LBA space.

5. The method of claim 3, further comprising:
receive partitioning information that partitions an LBA space into a plurality of LBA partitions;
defining translation maps for each of the LBA partitions;
obtaining offset data for access requests associated with each of the LBA partitions;
determining an alignment offset for each of the partitions based on the offset data; and
adjusting the translation maps for each of the partitions based on the alignment offset corresponding to the respective partition.

6. The method of claim 3, wherein the solid-state data storage device comprises at least one of an Electrically Erasable Programmable Read-Only Memory (EEPROM) device, a Flash solid-state drive, or a NAND Flash solid-state drive.

7. The method of claim 3, wherein each LBA corresponds to a logical hard drive sector addressable by at least one of an operating system, a device driver, or a device controller.

8. The method of claim 3, wherein each PBA corresponds to a page within the solid-state storage device.

9. A device comprising:
one or more programmable processors;
a mapping module configured in the one or more processors to define a translation map between a plurality of logical block addresses (LBAs) and a plurality of physical block addresses (PBAs) for a solid-state data storage device, wherein each PBA is associated with a sequence of storage slots, and wherein the translation map maps each of the LBAs to a PBA and to an index of a storage slot associated with the PBA; and
a data gatherer module configured in the one or more processors to:
form a counter array having a number of array elements equal to a number of storage slots within the sequence of storage slots associated with each PBA, and wherein each array element tracks a number of access requests within a plurality of access requests that have a particular offset value,
apply a remainder operation to a dividend and divisor for each of the access requests, wherein the dividend for each access request is a starting LBA for the access request, wherein the divisor for each access request is a number of LBA storage slots within each physical block associated with a PBA space, wherein the results of the remainder operations are obtained until a number of the data access requests is greater than a threshold number, and wherein the threshold number is based on an age of the data storage device or on a result of analyzing past trends of data access patterns,
for each result of the remainder operation, increment a respective one of the array elements that correspond to the result of the remainder operation, and
wherein the mapping module is further configured analyze the counter array to determine an alignment offset for an LBA space defined by the plurality of LBAs, and to adjust the translation map based on the alignment offset during system operation.

10. The device of claim 9, wherein the mapping module is further configured to select an offset value corresponding to an array element having a largest counter value as the alignment offset for the LBA space.

11. The device of claim 9, wherein the mapping module is further configured to receive partitioning information that partitions an LBA space into a plurality of LBA partitions, and to define translation maps for each of the LBA partitions, wherein the data gatherer module is further configured to obtain offset data for access requests associated with each of the LBA partitions, and wherein the mapping module is further configured to determine an alignment offset for each of the partitions based on the offset data, and to adjust the translation maps for each of the partitions based on the alignment offset corresponding to the respective partition.

12. The device of claim 9, wherein the solid-state data storage device comprises at least one of an Electrically Erasable Programmable Read-Only Memory (EEPROM) device, a Flash solid-state drive, or a NAND Flash solid-state drive.

13. The device of claim 9, wherein each LBA corresponds to a logical hard drive sector addressable by at least one of an operating system, a device driver, or a device controller.

14. The device of claim 9, wherein each PBA corresponds to a page within the solid-state storage device.

15. A non-transitory computer-readable storage medium comprising executable instructions that cause one or more processors to:

define a translation map between a plurality of logical block addresses (LBAs) and a plurality of physical block addresses (PBAs) for a solid-state data storage device, wherein each PBA is associated with a sequence of storage slots, and wherein the translation map maps each of the LBAs to a PBA and to an index of a storage slot associated with the PBA;

form a counter array having a number of array elements equal to a number of storage slots within the sequence of storage slots associated with each PBA, wherein each array element tracks a number of access requests within a plurality of access requests that have a particular offset value;

apply a remainder operation to a dividend and divisor for each of the plurality of access requests, wherein the dividend for each access request is a starting LBA for the access request, wherein the divisor for each access request is a number of LBA storage slots within each physical block associated with a PBA space, wherein the results of the remainder operations are obtained until a number of the data access requests is greater than a threshold number, and wherein the threshold number is based on an age of the data storage device or on a result of analyzing past trends of data access patterns;

for each result of the remainder operation, increment a respective one of the array elements that correspond to the result of the remainder operation;

analyze the counter array to determine an alignment offset for an LBA space defined by the plurality of LBAs; and     adjust the translation map based on the alignment offset during system operation.

\* \* \* \* \*